United States Patent
Yagyu

(10) Patent No.: US 7,813,309 B2
(45) Date of Patent: Oct. 12, 2010

(54) RADIO MULTI-HOP NETWORK, NODE, MULTICAST ROUTE CONTROL METHOD, AND PROGRAM THEREOF

(75) Inventor: Tomohiko Yagyu, Tokyo (JP)

(73) Assignee: NEC Corporation, Tokyo (JP)

( * ) Notice: Subject to any disclaimer, the term of this patent is extended or adjusted under 35 U.S.C. 154(b) by 117 days.

(21) Appl. No.: 12/209,910

(22) Filed: Sep. 12, 2008

(65) Prior Publication Data

US 2009/0073910 A1    Mar. 19, 2009

(30) Foreign Application Priority Data

Sep. 13, 2007    (JP)    ............................. 2007-237657

(51) Int. Cl.
     *H04H 20/71*    (2008.01)
(52) U.S. Cl. ..................................... 370/312
(58) Field of Classification Search ................ 370/312, 370/217, 390, 252, 278, 400, 256, 351, 315, 370/310; 709/222, 245; 713/163
See application file for complete search history.

(56) References Cited

U.S. PATENT DOCUMENTS

| | | | | |
|---|---|---|---|---|
| 6,957,277 | B2 * | 10/2005 | Yagyu et al. ................ | 709/245 |
| 7,106,735 | B2 * | 9/2006 | Yagyu et al. ................ | 370/390 |
| 2002/0012320 | A1 * | 1/2002 | Ogier et al. ................ | 370/252 |
| 2006/0256741 | A1 * | 11/2006 | Nozaki ........................ | 370/278 |
| 2008/0175240 | A1 * | 7/2008 | Suzuki ........................ | 370/390 |
| 2008/0186907 | A1 | 8/2008 | Yagyuu | |

FOREIGN PATENT DOCUMENTS

JP    3893620 B2    3/2007
WO    2006059643    12/2006

OTHER PUBLICATIONS

T. Clausen et al, "Optimized Link State Routing Protocol for Ad Hoc Networks", IEEE INMIC, Dec. 2001.
Anis Laouiti et al, Multicast Optimized Link State Routing, Inria Research Report No. 4721, Feb. 2003, ftp:ftp.inria.fr/INRIA/publication/publi-pdf/RR/RR-4721.pdf.
Carlos De Morais et al, "Multicast over Wireless Mobile Ad Hoc Networks: Present and Future Directions", IEEE Network Magazine, Jan./Feb. 2003.

* cited by examiner

*Primary Examiner*—Pankaj Kumar
*Assistant Examiner*—Prenell P Jones
(74) *Attorney, Agent, or Firm*—Sughrue Mion, PLLC

(57) ABSTRACT

In a node 11, a unicast route control information acquirer 103 acquires unicast route control information from the multicast information and a TC message received from another node respectively. A relay node set calculator 104 uses the information to calculate a sender relay node set that covers every multicast receiver node and a receiver relay node set that covers every multicast receiver node respectively, then a multicast route calculator 105 calculates a multicast route between a node included in the sender relay node set and a node included in the receiver relay node set.

28 Claims, 5 Drawing Sheets

RADIO MULTI-HOP NETWORK, NODE, MULTICAST ROUTE CONTROL METHOD, AND PROGRAM THEREOF

This application is based upon and claims the benefit of priority from Japanese patent application No. 2007-237657, filed on Sep. 13, 2007, the disclosure of which is incorporated herein in its entirety by reference.

BACKGROUND OF THE INVENTION

The present invention relates to a multi-hop network, a node, a multicast route control method, and a program used for multicast communications respectively.

There are some unicast route control methods used in general radio multi-hop networks. For example, a non-patent document 1 (T. Clausen et al, "Optimized Link State Routing Protocol for Ad Hoc Networks", IEEE INMIC, December, 2001) discloses such a radio multi-hop control method. Hereunder, there will be described OLSR (Optimized Link State Routing) disclosed in the non-patent document 1.

In case of the OLSR, a communication device broadcasts Hello messages to its neighbor nodes at predetermined sending intervals after the system is started up. Those Hello messages are not forwarded. The messages are received only by the communication devices (hereinafter, to be referred to as nodes) existing within a radio transmission range.

If a node receives such a Hello message from another node, the node holds the message information in an neighbor node table while the message is valid. If the node sends a Hello message to another node, the node includes a list of the IP addresses of all the nodes recorded such way in the neighbor node table into the Hello message. Receiving such a Hello message that includes the neighbor node information, the receiver node selects an MPR (Multi Point Reply) node and sends a TC (Topology Control) message to the MPR node.

An MPR node means a forwarding node that forwards route control messages (TC messages or like) to be received by all nodes in the subject network. The MPR node selection is made by calculating a set of neighbor nodes that cover all the nodes existing two hops away from the calculating node. An MPR node selected by such a node is notified to its neighbor nodes through the Hello message. Consequently, the neighbor nodes can know they are required respectively to forward the message if receiving such a control message as a TC packet or the like and it is required to be notified to every node in the network from the node selected as an MPR node by itself.

The TC message notifies the link information of a source node (usually, the information of a link with the selected MPR node) to every node in the subject network. The TC message is created at a preset sending interval and forwarded by the MPR node to be notified to every node in the network. The link information set in such a TC message received from another node is stored in a topology table. Each communication node creates a network topology graph from the link information recorded in the topology table to calculate the shortest route to each destination communication node. And according to the result of this calculation, the object communication forwarding route is set.

A non-patent document 2 (Anis Laouiti et al, "Multicast Optimized Link State Routing", Inria Research Report No. 4721, February, 2003, (ftp://ftp.inria.fr/INRIA/publication/publi-pdf/RR/RR-4721.pdf)) discloses a multicast control method (hereunder, to be referred to as the M-OLSR) employed for radio multi-hop networks. The method is expanded from the OLSR mechanism disclosed in the non-patent document 1.

In case of the M-OLSR, each multicast packet sender node floods the SOURCE_CLAIM message all over the subject network. Receiving such a SOURCE_CLAIM message, the receiver node that is to receive the multicast sends a CONFIRM_PARENT message to the next hop node (a node required to forward packets addressed to the sender node) so as to be forwarded to the sender node. The relay node that has received the CONFIRM_PARENT message thus forwards the CONFIRM_PARENT message to the next hop node set by the sender node similarly unless the relay node is neither the receiver node nor relay node of the multicast, thereby setting a multicast forwarding table. If the relaying node is already set as the receiver or relay node of the multicast communication, the node sets a multicast table and does not forward the CONFIRM_PARENT message. The sender node keep sending the SOURCE_CLAIM message and the receiver and forwarding nodes keep sending the CONFIRM_PARENT message periodically to maintain the multicast forwarding table respectively. If not receiving any messages for a certain period, it is regarded that the sender or receiver node has disappeared, so that the subject entry in the multicast forwarding table is deleted.

A non-patent document 3 (Carlos de Morais et al, "Multicast over Wireless Mobile Ad Hoc Networks: Present and Future Directions", IEEE Network Magazine, January/February, 2003) also discloses still another multicast control method employed for radio multi-hop networks. In addition to the above control methods, still other various similar methods have been disclosed. According to the non-patent document 3, such multicast control methods are roughly classified into the tree type method and the mesh type method. In case of the tree type method, a representative node is determined first, then both the sender and the receiver (members) of the multicast communication join in the communications with the representative node, thereby constructing a multicast distribution tree. In case of the mesh type method, a route is formed between each pair (of a sender node and a receiver node). The above-described M-OLSR is also included in this mesh type method.

In case of the conventional mesh type multicast route control method described above, however, because a route is formed between each pair of a sender node and a receiver node, the number of routes to be formed, as well as the number of required control messages increase respectively. Consequently, it is difficult to employ the method for narrow band networks. Furthermore, when the number of routes increases such way and accordingly the number of nodes that forward multicast packets increases, packet sending operations among those nodes come to interfere with each another, thereby causing degradation of communications (confliction of packets, packet losses, increases of delays, etc.).

And in order to avoid such conventional problems, there have been considered a technique that adjusts the frequency of control packets exchanged with other nodes with use of moving information including the self-node moving speed (e.g., refer to a patent document 1 (Japanese Patent No. 3893620).

SUMMARY OF THE INVENTION

However, the technique disclosed in the patent document 1 is required to measure the moving speed of the self-node and such a waste of time and labor should preferably be avoided.

Under such circumstances, it is an exemplary object of the present invention to provide a radio multi-hop network, a node, a multicast route control method, and a program employable to easily realize high quality multicast communications in any narrow band radio networks.

According to an exemplary aspect of this invention, there is provided a radio multi-hop network in which a plurality of nodes comprising a multicast sender node and a multicast receiver node exchange information with each another by radio to form a multi-hop network, wherein each of the nodes comprises:

a unicast route control information acquirer that acquires unicast route control information, which is information of the plurality of nodes, from the multicast information received from another node and a unicast route control message denoting the connection information of the node;

a relay node set calculator that calculates a sender relay node set that covers every multicast sender node and a receiver relay node set that covers every multicast receiver node with use of the unicast route control information; a multicast route calculator that calculates a multicast route between a node included in the calculated sender relay node set and a node included in the calculated receiver relay node set; and a route register that sets the calculated multicast route in a multicast forwarding table.

According to the exemplary aspect of this invention, the unicast route control information, which is information of plural nodes, is acquired from the multicast information received from another node and a unicast route control message denoting the connection information of the node. Then, the unicast route control information is used to calculate a sender relay node set that covers every multicast sender node and a receiver relay node set that covers every multicast receiver node and furthermore to calculate a multicast route between a node included in the calculated sender relay node set and a node included in the calculated receiver relay node set. And the calculated multicast route is set in a multicast forwarding table. The present invention can thus realize easily high quality multicast communications employable in any narrow band radio networks.

DESCRIPTION OF THE EXEMPLARY EMBODIMENTS

Figure 1:
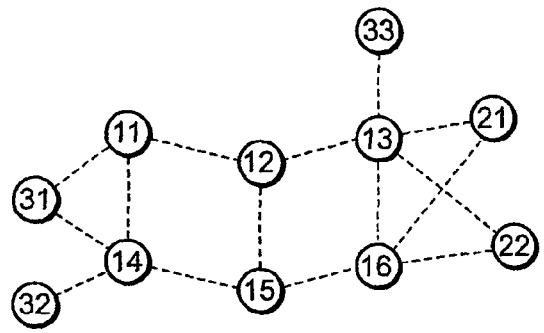
FIG. 1 is a diagram that shows a radio multi-hop network according to an exemplary embodiment of this invention.

Next, an exemplary embodiment of this invention will be described with reference to the drawing.

FIG. 1 shows a radio multi-hop network according to an exemplary embodiment of this invention. In the radio multi-hop network, packets are forwarded between communication nodes and those packets are sent from each source communication node (sender node) and received by each destination node (receiver node). Each communication node can communicate directly with any other communication nodes existing within the radio signals reaching range. In this embodiment, it is premised that the unicast route is controlled by the OLSR disclosed in the non-patent document 1. The multicast route control method of the present invention is expanded from the OLSR.

In this embodiment, the radio multi-hop network is composed of communication devices, that is, nodes 11 to 16, 21 to 22, and 31 to 33 as shown in FIG. 1. In FIG. 1, a dotted line between each pair of nodes 11 to 16, 21 to 22, and 31 to 33 denotes a relationship between those nodes that can communicate directly with each other by radio. Each communication node has a pair of a node ID and an IP address specific to itself. The IP address is a specific value for each node, so that the IP address may be used as a node ID.

The nodes 21 to 22 are multicast sender nodes that send multicast communication data respectively. The nodes 31 to 33 are multicast receiver nodes that receive multicast communication data respectively. The nodes 11 to 16 work only to forward multicast communication data; they do not send nor receive any data.

Figure 2:
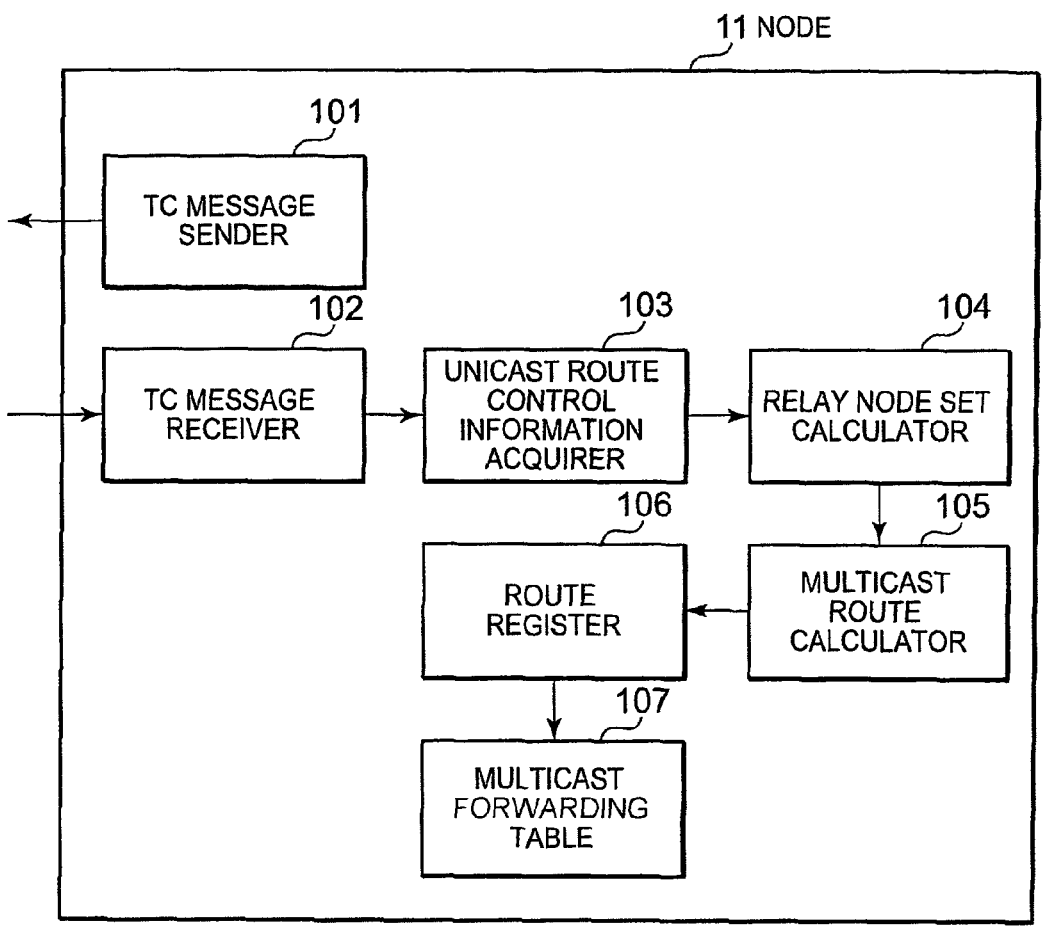
FIG. 2 is an example of the configuration of a node in the embodiment shown in FIG. 1.

FIG. 2 shows an example of the configuration of the node 11 shown in FIG. 1.

The node 11 shown in FIG. 1 includes a TC message sender 101; a TC message receiver 102; a unicast route control information acquirer 103; a relay node set calculator 104; a multicast route calculator 105; a route register 106; and a multicast forwarding table 107 as shown in FIG. 1. The components shown in FIG. 2 are employed only for the present invention. The nodes 12 to 16, 21 to 22, and 31 to 33 are all the same in configuration as that of the node 11.

The TC message sender 101 of one node 11 sends such a TC (Topology Control) message to the other node. The TC message is a unicast route control message denoting the connection information of the node 11. At this time, the TC message includes the subject multicast information.

The TC message receiver 102 receives the TC message from the other node.

The unicast route control information acquirer 103 acquires the unicast route control information from the TC message received by the TC message receiver 102. The unicast route control information is that of any of the nodes 12 to 16, 21 to 22, and 31 to 33.

The relay node set calculator 104 calculates a sender relay node set that covers all of the sender nodes 21 to 22 with use of the unicast route control information acquired by the unicast route control information acquirer 103 and calculates a receiver relay node set that covers all of the receiver nodes 31 to 33 with use of the same unicast route control information.

The multicast route information calculator 105 calculates a multicast route between a node included in the sender relay node set and a node included in the receiver relay node set calculated by the relay node set calculator 104 respectively.

The route register 106 registers the multicast route calculated by the multicast route information calculator 105 in the multicast forwarding table 107.

A node that sends/receives multicast communication data adds the following Join information to each Hello message of the OLSR and sends the Hello message to the destination node.

(Group Address: Sender/Receiver Indicator)

The Hello message may be sent periodically just like the unicast signals and the message may be sent as needed when a new Join event occurs. A group address is used to identify multicast information to be sent or received. The sender/receiver indicator denotes that the subject node is one of or both of a sender and a receiver with respect to the object group.

Receiving a Hello message that includes Join information from an neighbor node, the subject node checks whether or not the neighbor node selects itself as an MPR (Multi Point Reply) node. The Hello message can be used to know the result. If the neighbor node selects itself as an MPR node, the subject node sends a TC message that includes multicast information to the neighbor node through the TC message sender 101.

(Group Address: Node List)

The TC message may be sent without including multicast information. In this case, the multicast information is included in the multicast route control message and sent out.

The TC message may be sent periodically just like unicast information. It may also be sent as needed when a sender/receiver node is detected newly. The group address is used to identify multicast information to be sent/received. The node list lists up multicast sender and receiver nodes, each of which selects itself as an MPR. If a node is a sender or receiver node, the node itself is included in the node list. The node list consists of the following information items.

(Node ID: Sender/Receiver Indicator)

In FIG. 1, as a receiver (destination) node included in the group G, each of the nodes 31 to 33 adds Join information to each Hello message. Each of the nodes 21 and 22 adds Join information to each Hello message as a sender (source) node of the group G.

The node 31 selects the nodes 11 and 14 as MPR nodes. The node 32 selects the node 14 as an MPR node. The node 33 selects the node 13 as an MPR node. The node 21 selects the nodes 13 and 16 as MPR nodes. The node 22 selects the nodes 13 and 16 as MPR nodes. Each MPR node is selected with the same method as the OLSR method in a unicast route control process.

Each of the nodes 11, 13, 14, and 16 sends TC messages that include multicast information respectively. For example, the multicast information included in a TC message by the node 13 is composed as follows.

[group G: [node 21: sender], (node 22: sender), (node 33: receiver)]]

The TC message may be sent without including multicast information. In this case, the multicast information is included in a multicast route control message and sent out.

A TC message sent by an MPR node is distributed to every node in the subject network. Each node, upon receiving a new TC message, begins calculations of both the unicast route and the multicast route. The calculation of the unicast route is the same as that of the OLSR, so that the description for the calculation will be omitted here. Next, there will be described the calculation of the multicast route only.

At first, a node calculates the least sender MPR set (hereunder, to be referred to as the LSM), which is a sender relay node set and the least receiver MPR set (hereunder, to be referred to as the LRM), which is a receiver relay node set.

The LSM is the least set of MPR nodes that cover all the sender nodes. The LRM is the least set of MPR nodes that cover all the receiver nodes. Because every node determines the LSM and the LRM uniquely, the node calculates the LSM and the LRM in the following procedures respectively.

*LSM calculation method

Figure 3:
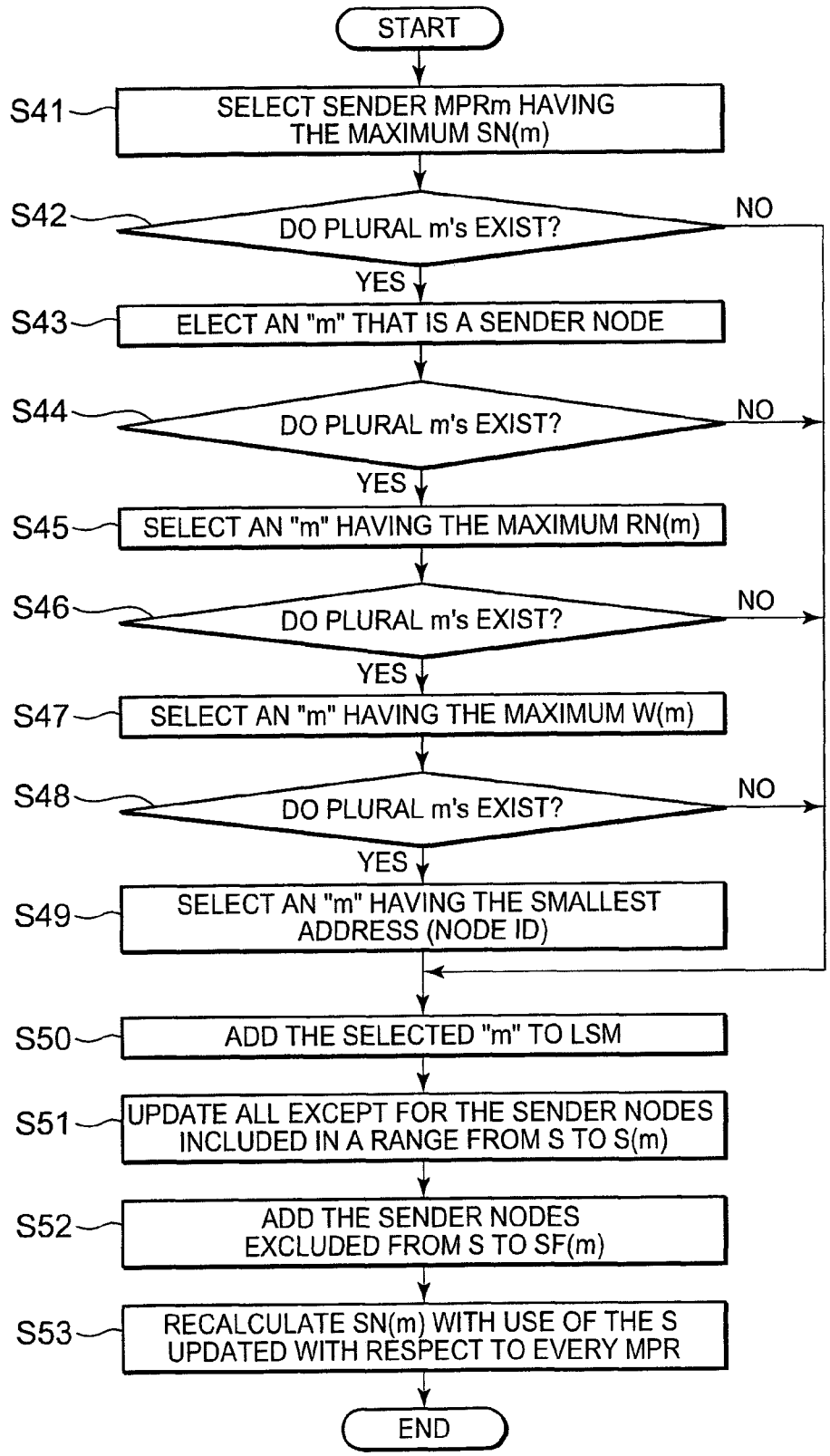
FIG. 3 is a flowchart that describes how to calculate the LSM in the embodiment shown in FIG. 1.

FIG. 3 shows a flowchart of how to calculate the LSM in the embodiment shown in FIG. 1.

At first, the unicast route control information acquirer 103 generates the following information items (S, S(m), SN(m), RN(m), and W(m)) from valid TC messages received by the TC message receiver 102. The information of those nodes are included in unicast route control messages.

S: A set of all the sender nodes advertised in TC
S(m): A set of sender nodes advertised by MPRm
SN(m): The number of sender nodes included in the S among the sender nodes advertised by MPRm
RN(m): The number of receiver nodes advertised by MPRm
W(m): A value denoting an intension of forwarding packets of a node defined with Willingness and OLSR. Generally, the value is within "0" to "7". The higher the packet forwarding performance is, the higher the Willingness value is set.

The relay node set calculator 104 repeats the processings (1) to (9) shown below with respect to those information items until the S becomes empty, thereby calculating both LSM and SF(m). At this time, the order the MPR nodes are selected is also recorded. Here, the LSM and SF(m) are defined as follows.

LSM: A set of the least sender MPRs
SF(m): A set of sender nodes in which MPRm is responsible for forwarding multicast packets (1) A sender MPRm having the maximum SN(m) is selected (step S41).
(2) An "m" that itself is also a sender node is selected if there are plural m's in (1) (step S43).
(3) An "m" having the maximum RN(m) is selected if there are plural m's in (2) (step S45).
(4) An "m" having the maximum W(m) is selected if there are plural m's in (3) (step S47).
(5) An "m" having the smallest address (node ID) is selected if there are plural m's in (4) (step S49).
(6) Each of the m's determined uniquely in (1) to (5) is added to LSM (step S50).
(7) The sender nodes included in the range from S to (S(m) are excluded (step S51).
(8) The sender nodes excluded from S in (7) are added to SF(m) (step S52).
(9) The SN(m) is recalculated according to the S updated in (7) for every MPR (step S53).

The LRM is also calculated similarly to the LSM.

*LRM calculation method

Figure 4:
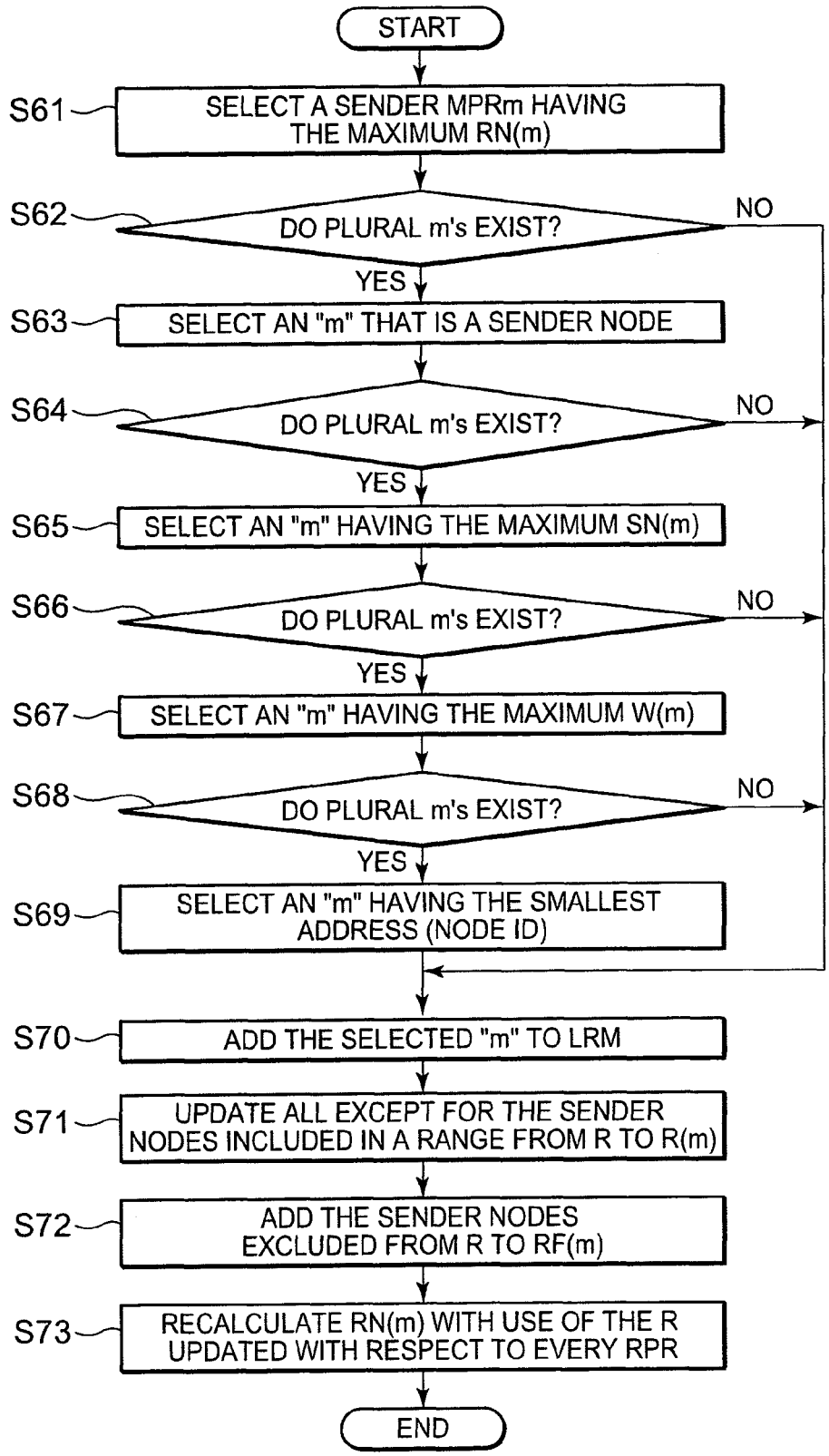
FIG. 4 is a flowchart that describes how to calculate the LRM in the embodiment shown in FIG. 1.

FIG. 4 shows a flowchart for describing how to calculate the LRM in the embodiment shown in FIG. 1.

At first, the unicast route control information acquirer 103 generates the following information items (R, R(m), RN(m), SN(m), and W(m)) from each effective TC message received by the TC message receiver 102. Those node information items are unicast route control information.

R: A set of all the receiver nodes advertised in TC
R(m): A set of receiver nodes advertised by MPRm
RN(m): The number of receiver nodes included in the R among the receiver nodes advertised by MPRm
SN(m): The number of sender nodes advertised by MPRm
W(m): Willingness of MPRm The relay node set calculator 104 repeats the processings (11) to (19) for those information items until R becomes empty, thereby calculating both LRM and RF(m). At this time, the order the MPR nodes are selected is also recorded. Here, the LRM and RF(m) are defined as follows.

LRM: A set of the least receiver MPRs

RF(m): A set of receiver nodes in which MPRm is responsible for packet forwarding

(11) The MPRm having the maximum RN(m) is selected (step S61).

(12) An "m" that is a receiver node is selected if there are plural m's in (11) (step S63).

(13) An "m" having the maximum SN(m) is selected if there are plural m's in (12) (step S64).

(14) An "m" having the maximum W(m) is selected if there are plural m's in (13) (step S67).

(15) An "m" having the smallest address (node ID) is selected if there are plural m's in (14) (step S69).

(16) Each of the m's determined uniquely in (11) to (15) is added to LRM (step S70).

(17) The receiver nodes included in the range from R to R(m) are excluded (step S71).

(18) The receiver nodes excluded from R in (17) are added to RF(m) (step S72).

(19) The RN(m) is recalculated according to the R updated in (17) for every MPR (step S73).

The LRM and LSM as shown below are thus acquired with the above calculations.

Figure 5:
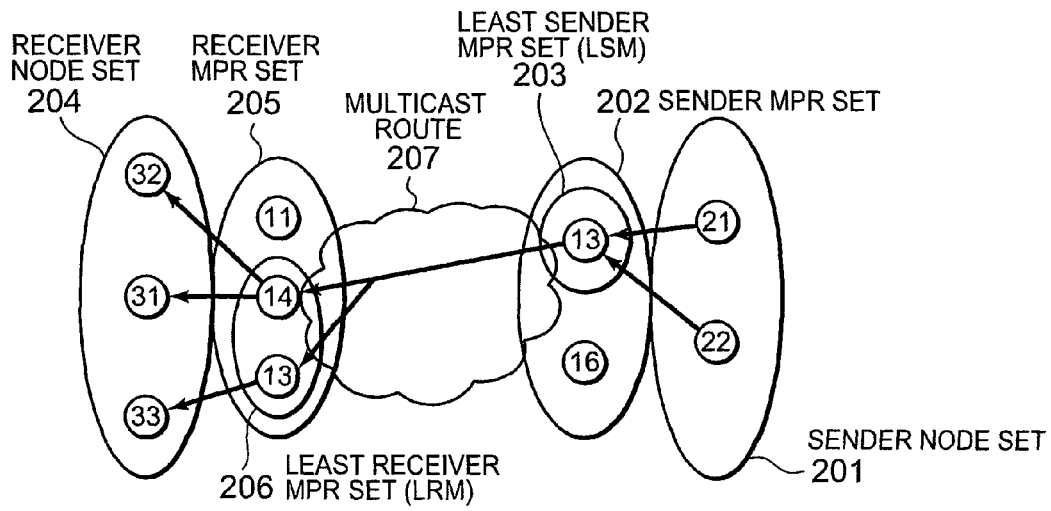
FIG. 5 is a diagram that shows the LSM and the LRM in the embodiment shown in FIG. 1.

FIG. 5 shows a diagram that describes the LSM and LRM in the embodiment shown in FIG. 1.

As shown in FIG. 5, the MPR nodes included in the receiver MPR set 205 that covers all the receiver nodes 31 to 33 included in the receiver node set 204 are the nodes 11, 13, and 14. Here, the node 32 covered by the node 11 is also covered by the node 14, so that the nodes 13 and 14 comes to be included the least receiver MPR set (LRM) 206. The order of the nodes are assumed as {node 14, node 13}, since the node 14 covers more receiver nodes than the node 13. And the MPR nodes included in the sender MPR set 202 that covers all the sender nodes 21 and 22 included in the sender node set 201 are nodes 13 and 16. Here, the node 13 also covers the node 33, so that the least sender MPR set (LSM) becomes {node 13}.

Completing the calculation of the LSM and LRM, the multicast route information calculator 105 begins the calculation of the multicast route 207 between a node in the LSM and a node in the LRM as follows, thereby determining the route of every node uniquely.

Here, the i-th sender MPR of the LSM is assumed as SMi and the j-th receiver MPR of the LRM is assumed as RMi. The multicast route information calculator 105 calculates the shortest route from SMi to RMi with respect to each of the i and j. In the calculation is used only the topology information of each TC message and the Dijkstra algorithm. The multicast route information calculator 105 calculates all of the equal cost shortest routes and records those calculated shortest routes. The node m forwarding cost is assumed as (Will_always−W(m)+1) with use of Willingness. Here, the Will_always means Willingness of which value is "7".

In order to make the calculation so that the routes from the sending MPR SMi to RM1, as well as from there to RMj come to fall on each other, the multicast route information calculator 105 subtracts the metric just by a certain value upon calculating the route from the SMi to RMk with respect to each link on the calculated routes from the SMi to the RM1, as well as from there to the RMk-1. Furthermore, in order to avoid interferences that might otherwise occur during forward operations, the multicast route information calculator 105 calculates a route passing a link that cannot be interfered easily by adding a certain value to the metric with respect to each link that might interfere with another link on the calculated routes from the SMi to the RM1, as well as from there to the RMk-1.

If there are plural shortest routes, each node determines its shortest route uniquely in the following procedure.

Figure 6:
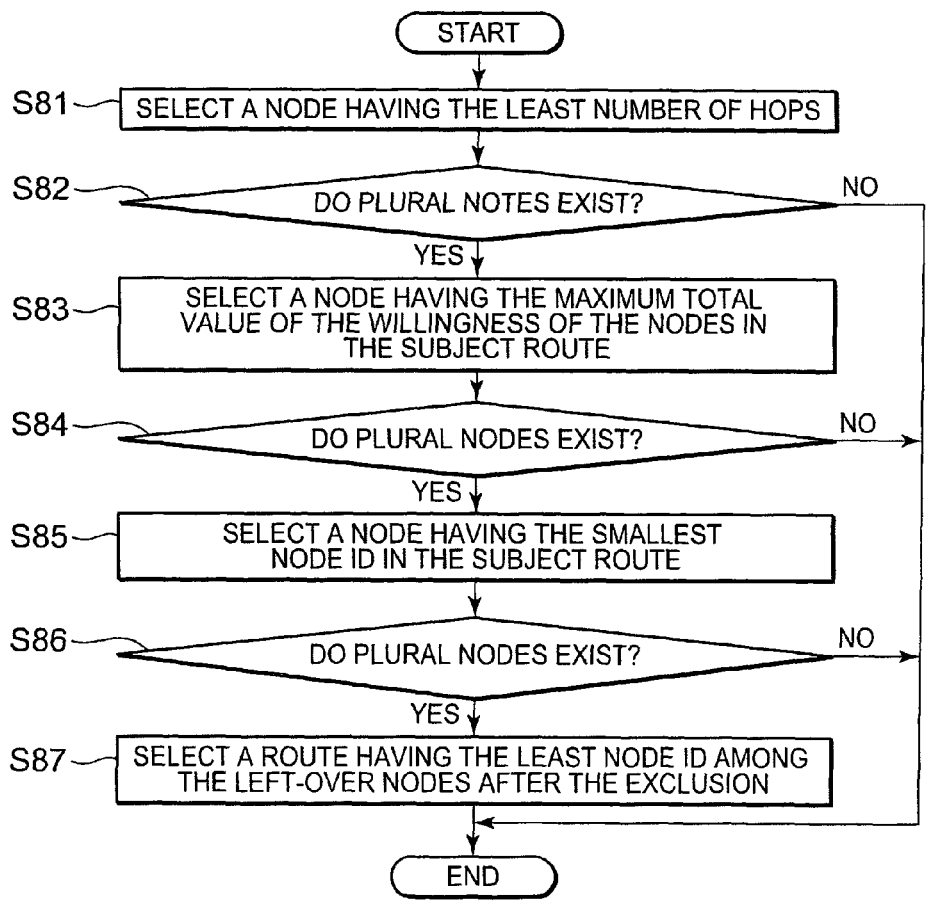
FIG. 6 is a flowchart that describes how to calculate a multicast path in the embodiment shown in FIG. 1.

FIG. 6 shows a flowchart that describes how to calculate a multicast route in the embodiment shown in FIG. 1. Each node repeats the processings (21) to (24) to determine its multicast route uniquely.

(21) An object having the least number of hops is selected (step S81).

(22) An object having the maximum total value of the Willingness values of the nodes in the route is selected if there are plural shortest routes in (21) (step S82).

(23) An object having the smallest node ID is selected from among the shortest routes (step S84) if there are plural shortest routes in (21) and (22) (step S84).

(24) An object having the smallest node ID is selected from among the nodes in the shortest routes (step S87) if there are plural shortest routes in (21) and (23) (step S86).

The present invention can thus find a multicast route for easily realizing high quality multicast communications with use of the multicast route control method that employs the LSM calculation method, the LRM calculation method, and the multicast route calculation method described above.

Figure 7:
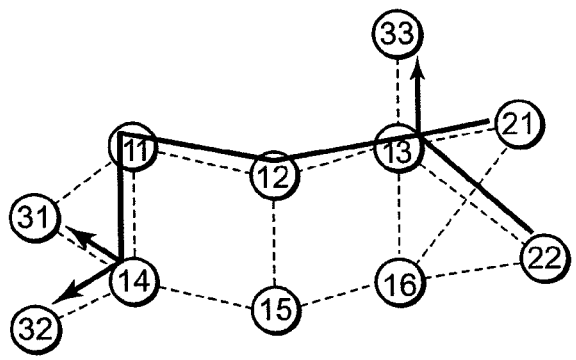
FIG. 7 is a diagram that shows a multicast route found with use of the multicast route control method described with reference to FIGS. 3, 4, and 6 in the embodiment shown in FIG. 1.

FIG. 7 shows a diagram that shows a multicast route found with use of the multicast route control method described with reference to FIGS. 3, 4, and 6 in the embodiment shown in FIG. 1. Here, the Willingness value is assumed to be the same among all the nodes.

Figure 8:
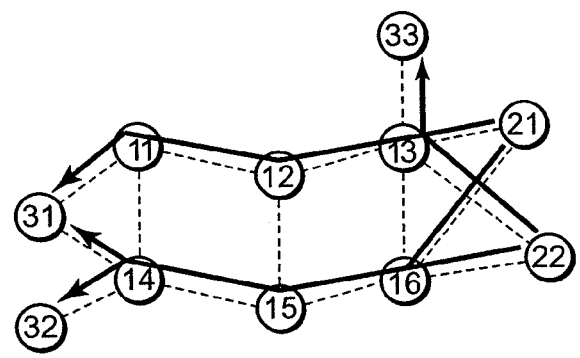
FIG. 8 is a diagram that shows an example of the multicast route formed for each pair of a sender node and a receiver node according to a general mesh type method.

FIG. 8 shows a diagram that shows a multicast route generated for each pair of a sender node and a receiver node with use of a general mesh type method.

In the comparison between the multicast routes shown in FIGS. 7 and 8, it would be understood that the number of routes is less in the multicast route shown in FIG. 7 than that shown in FIG. 8.

After completing the calculation of the multicast route, each node sets necessary entries in the multicast forwarding table 107 according to the calculated route and through the route register 106.

Concretely, each of the nodes 11 to 14 sets the following entries in the multicast forwarding table.

Node 11:
Destination: G, sender node: node 21, upstream node: node 12
Destination: G, sender node: node 22, upstream node: node 12
Node 12:
Destination: G, sender node: node 21, upstream node: node 13
Destination: G, sender node: node 22, upstream node: node 13
Node 13:
Destination: G, sender node: node 21, upstream node: node 21
Destination: G, sender node: node 22, upstream node: node 22
Node 14:
Destination: G, sender node: node 21, upstream node: node 11
Destination: G, sender node: node 22, upstream node: node 11

If a sender node of the SF(SMi) is included in the route from SMi to [RM1, . . . , RMi], (the sender node is assumed as x.

The "x" means that multicast packets received from the SMi at IP Src=x are not forwarded, that is, no multicast route is set at Src=x, Dest=G, and Up=SMi.

Figure 9:
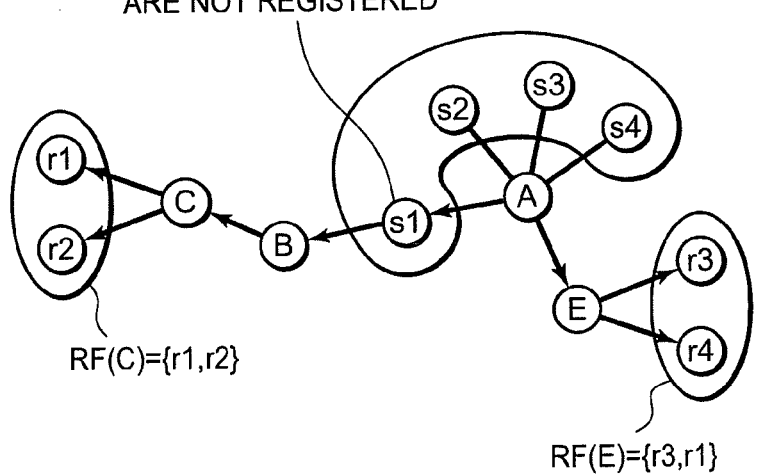
FIG. 9 is a diagram that shows a multicast example set when a sender node is included in a communication route.

FIG. 9 shows a multicast route set when a sender node is included in the subject communication route. Here, s1 to s4 denote sender nodes and r1 to r4 denote receiver nodes respectively.

As shown in FIG. 9, LSM=[A] and LRM=[C, E] are satisfied and the shortest route from A to C is the A→s1→B→C route. In this case, the nodes of SF(A)=[s1, s2, s3, s4] are included in the route, so that packets sent out from the s1 node is forwarded redundantly on the route of s1→A→s1→B→and C. Thus the s1 node does not register the route of which items are set as sender node=s1, destination=G, and upstream node=A. The node A sets the route so as to forward multicast packets received from the node s1. This means that if the node s1, which is a sender node, exists as a forwarding node, the node s1 does not register the route of the multicast packets sent from itself (s1) in the multicast forwarding table. Consequently, multicast packets received from the node s1 are forwarded on the route of s1→B→C and on the route of s1→A→E, so that those packets reach every receiver node.

The route table (multicast forwarding table 107) set by the node A is as follows.
Destination: G, sender node: s1, upstream node: s1
Destination: G, sender node: s2, upstream node: s2
Destination: G, sender node: s3, upstream node: s3
Destination: G, sender node: s4, upstream node: s4

The node s1 registers its route as follows.
Destination: G, sender node: s2, upstream node: A
Destination: G, sender node: s3, upstream node: A
Destination: G, sender node: s4, upstream node: A In the embodiment described above, an MPR node having the maximum SN(SMi) is selected preferentially in the sender MPR node selection procedure (1) of the LSM calculation method. However, as to be described below, it is also possible to select an MPRm by taking consideration to the number of sender nodes to be covered and the route cost that means a route length from a sender node to a receiver node.

In prior to the calculation of the LSM, the cost of the shortest route from every sender MPR (SMi) to every receiver MPR(RMj) is calculated beforehand. The cost of the shortest route from SMi to RMj is assumed as Cij.

The procedure for selecting a sender MPR (1) according to the LSM calculation method will be as follows.

(1) The MPRm having the maximum value of $SNm/(Ci1+Ci2+\ldots+Cij)$ is selected.

Similarly, it is possible to select the MPRm by taking consideration to the number of receiver nodes to be covered and the route cost, which is a length of the route from a sender node to a receiver node.

As described above, the communication node of the present invention sends multicast information with use of the unicast route control message, thereby reducing the load of the multicast control message.

Furthermore, the communication node of the present invention uses the unicast route control information to calculate a sender relay node set that covers every multicast sender node and a receiver relay node set that covers every multicast receiver node and to calculate a multicast route between a node included in the sender relay node set and a node included in the receiver relay node set, thereby suppressing the increase of the number of multicast routes. Because the number of multicast routes is reduced such way, the present invention can form a multicast distribution tree that will cause less interferences. Furthermore, the present invention can reduce interferences that might otherwise occur while packets are forwarded, thereby improving the communication quality.

Consequently, the present invention can control multicast routes that will cause less interferences while suppressing the control load suitably for radio communications.

Because interferences are reduced such way, the present invention can avoid conflictions among communications and improve the throughput in each radio network controlled by the CSMA/CA. Furthermore, the present invention can reduce the number of time-slots required for multicast distribution, thereby improving the utilization efficiency of resources in each radio network controlled by the TDMA.

The processings described above may be carried out in a logic circuit manufactured in accordance with the purpose. Those processings may be described as a program on a recording medium that can be read by each node and the program is read and executed by each node. The recording medium readable by each node may be any of such removable media as floppy disks (trade mark), optical magnetic disks, DVDs, CDs, etc., as well as the HDD or the like built in each node. The program recorded on this recording medium is read by the CPU (not shown) in each node and executed under the control of the CPU just like the processings described above. The CPU operates as a computer that executes the program read from the recording medium.

While the invention has been particularly shown and described with reference to exemplary embodiments thereof, the invention is not limited to these embodiments. It will be understood by those of ordinary skill in the art that various changes in form and details may be made therein without departing from the sprit and scope of this invention as defined by the claims.

What is claimed is:

1. A radio multi-hop network in which a plurality of nodes comprising a multicast sender node and a multicast receiver node exchange information each other by radio to form a multi-hop network,
    wherein each of the nodes comprises:
        a unicast route control information acquirer that acquires unicast route control information, which is information of the plurality of nodes, from the multicast information received from other nodes and unicast route control messages denoting the connection information among nodes;
        a relay node set calculator that calculates a sender relay node set that covers all multicast sender nodes and a receiver relay node set that covers all multicast receiver nodes with use of the unicast route control information;
        a multicast route calculator that calculates multicast routes between nodes included in the calculated sender relay node set and nodes included in the calculated receiver relay node set; and
    a route register that sets the calculated multicast routes in a multicast forwarding table.

2. The radio multi-hop network according to claim 1,
    wherein the network comprises a TC message sender that sends the multicast information included in the unicast route control messages.

3. The radio multi-hop network according to claim 1,
    wherein the multicast route calculator calculates the multicast routes between the nodes included in the calculated sender relay node set and the nodes included in the calculated receiver relay node set by subtracting the metric by a predetermined value from a link on the calculated multicast route.

4. The radio multi-hop network according to claim 1,
wherein the multicast route calculator calculates the multicast route between the node included in the calculated sender relay node set and the node included in the calculated receiver relay node set by adding the metric by a predetermined value to a link that interferes with another link on the calculated multicast route.

5. The radio multi-hop network according to claim 1,
wherein the relay node set calculator selects the sender relay node set and the receiver relay node set according to the number of multicast sender nodes and the number of the multicast receiver nodes respectively.

6. The radio multi-hop network according to claim 1,
wherein the relay node set calculator selects the sender relay node set and the receiver relay node set according to the length of the route between the multicast sender node and the multicast receiver node.

7. The radio multi-hop network according to claim 1,
wherein the route register, if the multicast sender node exists as a forwarding node on the multicast route, avoids registration of the multicast route for a multicast packet received from the node in the multicast forwarding table.

8. A node that forms a multi-hop network by exchanging information with others by radio comprises:
a unicast route control information acquirer that acquires unicast route control information, which is node information, from the multicast information received from another node and a unicast route control message denoting the connection information of the node;
a relay node set calculator that calculates a sender relay node set that covers every multicast sender node and a receiver relay node set that covers every multicast receiver node with use of the unicast route control information;
a multicast route calculator that calculates a multicast route between a node included in the calculated sender relay node set and a node included in the calculated receiver relay node set; and
a route register that sets the calculated multicast route in a multicast forwarding table.

9. The node according to claim 8,
wherein the node further comprises a TC message sender that sends the multicast information included in the unicast route control message.

10. The node according to claim 8,
wherein the multicast route calculator calculates a multicast route between the node included in the calculated sender relay node set and the node included in the calculated receiver relay node set by subtracting the metric by a predetermined value from a link on the calculated multicast route.

11. The node according to claim 8,
wherein the multicast route calculator calculates the multicast route between the node included in the calculated sender relay node set and the node included in the calculated receiver relay node set by adding the metric by a predetermined value to a link that interferes with another link on the calculated multicast route.

12. The node according to claim 8,
wherein the relay node set calculator selects the sender relay node set and the receiver relay node set according to the number of multicast sender nodes and the number of the multicast receiver nodes respectively.

13. The node according to claim 8,
wherein the relay node set calculator selects the sender relay node set and the receiver relay node set according to the length of the route between the multicast sender node and the multicast receiver node.

14. The node according to claim 8,
wherein the route register, if the multicast sender node exists as a forwarding node on the multicast route, avoids registration of the multicast route for a multicast packet received from the node in the multicast forwarding table.

15. A multicast route control method that enables a plurality of nodes, each of which comprises a multicast sender node and a multicast receiver node, to exchange information with each another by radio to form a multi-hop network, the method comprises:
a step in which the node acquires unicast route control information, which is information of the plurality of nodes, from the multicast information received from a different node and a unicast route control message denoting the connection information of the different node;
a step in which the node calculates a sender relay node set that covers every multicast sender node and a receiver relay node set that covers every multicast receiver node with use of the unicast route control information;
a step in which the node calculates a multicast route between a node included in the calculated sender relay node set and a node included in the calculated receiver relay node set; and
a step in which the node sets the calculated multicast route in a multicast forwarding table.

16. The multicast route control method according to claim 15;
further comprising a step in which wherein the node sends the multicast information included in the unicast route control message.

17. The multicast route control method according to claim 15,
further comprising a step in which the node calculates the multicast route between the node included in the calculated sender relay node set and the node included in the calculated receiver relay node set by subtracting the metric by a predetermined value from a link on the calculated multicast route.

18. The multicast route control method according to claim 15,
further comprising a step in which the node calculates the multicast route between the node included in the calculated sender relay node set and the node included in the calculated receiver relay node set by adding the metric by a predetermined value to a link that interferes with another link on the calculated multicast route.

19. The multicast route control method according to claim 15,
further comprising a step in which the node selects the sender relay node set and the receiver relay node set according to the number of multicast sender nodes and the number of the multicast receiver nodes respectively.

20. The multicast route control method according to claim 15,
further comprising a step in which the node selects the sender relay node set and the receiver relay node set according to the length of the route between the multicast sender node and the multicast receiver node.

21. The multicast route control method according to claim 15,
further comprising a step in which the node, if the multicast sender node exists as a forwarding node on the multicast route, avoids registration of the multicast route of a multicast packet received from the node in the multicast forwarding table.

22. A non-transitory computer readable medium program to be executed by a computer to enable a plurality of nodes, each of which comprises a multicast sender node and a multicast receiver node, to exchange information with each another by radio to form a multi-hop network,
  wherein the program executes:
    a procedure of acquiring unicast route control information, which is information of the plurality of nodes, from the multicast information received from a different node and a unicast route control message denoting the connection information of the different node;
    a procedure of calculating a sender relay node set that covers every multicast sender node and a receiver relay node set that covers every multicast receiver node with use of the unicast route control information;
    a procedure of calculating a multicast route between a node included in the calculated sender relay node set and a node included in the calculated receiver relay node set; and
    a procedure of setting the calculated multicast route in a multicast forwarding table.

23. The non-transitory computer readable medium program according to claim 22,
  wherein the computer further executes a procedure of sending the multicast information included in the unicast route control message.

24. The non-transitory computer readable medium program according to claim 22,
  wherein the computer further executes a procedure of calculating the multicast route between the node included in the calculated sender relay node set and the node included in the calculated receiver relay node set by subtracting the metric by a predetermined value from a link on the calculated multicast route.

25. The non-transitory computer readable medium program according to claim 22,
  wherein the computer further executes a procedure of calculating the multicast route between the node included in the calculated sender relay node set and the node included in the calculated receiver relay node set by adding the metric by a predetermined value to a link that interferes with another link on the calculated multicast route.

26. The non-transitory computer readable medium program according to claim 22,
  wherein the program further executes a procedure of selecting the sender relay node set and the receiver relay node set according to the number of multicast sender nodes and the number of the multicast receiver nodes respectively.

27. The non-transitory computer readable medium program according to claim 22,
  wherein the computer further executes a procedure of selecting the sender relay node set and the receiver relay node set according to the length of the route between the multicast sender node and the multicast receiver node.

28. The non-transitory computer readable medium program according to claim 22,
  wherein the computer, if the multicast sender node exists as a forwarding node on the multicast route, further executes a procedure of avoiding the registration of the multicast route for a multicast packet received from the node in the multicast forwarding table.

* * * * *